（12）United States Patent
Wang et al.

(10) Patent No.: US 6,266,369 B1
(45) Date of Patent: Jul. 24, 2001

(54) MPEG ENCODING TECHNIQUE FOR ENCODING WEB PAGES

(75) Inventors: Chuanming Wang; Bruce Plotnick, both of Jamison, PA (US); Joseph Ellis Augenbraun, Princeton, NJ (US)

(73) Assignee: WorldGate Service, Inc., Trevose, PA (US)

( * ) Notice: Subject to any disclaimer, the term of this patent is extended or adjusted under 35 U.S.C. 154(b) by 0 days.

(21) Appl. No.: 09/093,879

(22) Filed: Jun. 9, 1998

(51) Int. Cl.[7] .................................................. H04N 7/12
(52) U.S. Cl. ............................ 375/240; 709/247; 348/13
(58) Field of Search .................................. 348/394, 400, 348/401, 402, 407, 412, 413, 415, 416, 13, 14, 15; 345/161, 173; 358/105; 375/240; 709/246, 247; H04N 7/12

(56) References Cited

U.S. PATENT DOCUMENTS

| | | | |
|---|---|---|---|
| 5,267,034 | * 11/1993 | Miyatake et al. | 358/105 |
| 5,396,287 | * 3/1995 | Cho | 345/161 |
| 5,640,195 | * 6/1997 | Chida | 348/13 |
| 5,699,458 | 12/1997 | Sprague . | |
| 5,815,604 | * 9/1998 | Simons et al. | 348/414 |
| 5,931,906 | * 8/1999 | Fidelibus, Jr. et al. | 709/217 |
| 5,959,690 | * 9/1999 | Toebes, VIII et al. | 348/416 |
| 5,978,029 | * 11/1999 | Boice et al. | 375/240.14 |
| 5,982,439 | * 11/1999 | Parke | 375/240.16 |
| 6,002,402 | * 12/1999 | Schacher | 345/353 |

OTHER PUBLICATIONS

ISO/IEC, "Information Technology—Generic Coding of Moving Pictures and Associated Audio Information: Video," International Standard ISO/IEC 13818-2, 1st ed., (1996).

\* cited by examiner

Primary Examiner—Howard Britton
Assistant Examiner—Nhon T Diep
(74) Attorney, Agent, or Firm—Jones, Tullar & Cooper PC

(57) ABSTRACT

A method and apparatus for digitally encoding video image data, which is particularly suited for encoding Internet Web pages, eliminates the need for performing time consuming, computationally intensive motion vector searches by taking advantage of prior knowledge regarding the Web page movement. In a first preferred embodiment, a digital video encoder, such as an MPEG encoder, employs Web page scrolling coordinates obtained from a browser application to determine, through calculation instead of searching, motion estimation for all the macroblocks of the present image frame relative to the previous frame. In a second preferred embodiment, the encoder receives information from the browser application that indicates that certain portions of an image, such as a Web page animation window, are continuously changing, and thus should be encoded as an intra frame. The invention may be employed in a cable television system which includes Internet access capabilities that permit system users to download Web pages for viewing on their televisions from a remote browser application located in the cable system's headend.

28 Claims, 4 Drawing Sheets

MPEG ENCODING TECHNIQUE FOR ENCODING WEB PAGES

BACKGROUND OF THE INVENTION

The present invention relates to a method and apparatus for digitally encoding video image data, and is particularly suited for encoding Internet Web pages for transmission and display.

With the ever-increasing popularity of the Internet, a number of systems and devices have appeared in the marketplace that substantially reduce the initial equipment expense required for accessing the Internet. For example, inexpensive dedicated processors are available which enable a user to access the Internet using a telephone line, and download Internet Web pages for display on the user's television set.

Recently, an even more attractive Internet access system has been proposed which completely eliminates the need for a user to have a telephone line and a dedicated processor running a browser application locally at their premises. This system employs a modified cable television (CATV) system that uses the downstream cable channels to transmit Internet-based information to the system users via for display on their television sets. Each user is provided with a set top converter box that has been modified to enable entry of data or commands via a keyboard, remote controller or other input device. One or more upstream channels are provided which transmit the entered data or commands to a headend server in the CATV system. The headend server is interfaced to the Internet via an Internet Service Provider (ISP), for example, and includes processing equipment which can simultaneously operate a plurality of resident Internet browser applications, one for each system user requesting Internet access. The headend server therefore contains all of the processing equipment necessary to access the Internet through the ISP, while each user's set top box acts as an input/output device for interfacing the user to the Internet.

In the operation of the system, a user requests Internet access by entering an appropriate command into the set top box that transmits the command through an upstream channel to the headend server. In response, the headend server connects the user to one of the resident browser applications via one of the system's downstream channels.

The Internet-based information, e.g., Web pages, can be transmitted through the downstream channel in a number of ways. In an analog implementation, for example, the Internet data can be inserted into the vertical or horizontal blanking intervals of the conventional analog television signals which are simultaneously transmitted on the selected downstream channel. In an all-digital embodiment, however, the Internet data must be encoded in the same format that is employed for digitally encoding video signals. More particularly, the data must be encoded using standardized procedures for encoding, storing, transporting and displaying continuous video frames that have been specified by The Motion Picture Experts Group (MPEG). Thus, the image bit map generated by the browser application is not rendered at the headend, but instead is further compressed by an MPEG image encoder. It is the compressed image data that is transmitted to a user.

MPEG encoding is a video image compression technique that substantially reduces the amount of motion picture image data that must be transmitted. This data reduction is made possible because spatial redundancy exists within an image frame (intra frame compression). In addition, each succeeding frame in a motion picture video usually contains substantial temporal redundancy, i.e., portions which have either not changed from the previous frame, or have only been moved relative to the previous frame (inter frame compression). When spatial redundancy is removed from a frame, the frame is said to be encoded as an intra-coded frame (I-frame). In an inter frame compression scheme, two different compression algorithms may be employed to generate two kinds of encoded frames. A compressed image frame is called a Predictive-coded frame (P-frame) if only a prior frame is compared and the difference is coded. Another inter frame compression results in a Bidirectionally predictive-coded frame (B-frame) if both a prior frame and a post frame are used for encoding. In these cases, it is not necessary to transmit all of the image data for each frame. Instead, only the difference data representing the portions in the current frame that have changed from the neighboring (previous or later) frame(s) is transmitted. For areas in an image which have been moved relative to the previous frame, it is possible to search for these areas, and then generate a motion vector which instructs a receiving decoder to construct a portion of the next image frame by moving a corresponding portion in the previous image frame a specified displacement and direction. To encode a sequence of video frames, the first frame is encoded as an intra or I frame where information for all of the pixels in the frame needs to be transmitted since no previous frame information is available. The next frame in the sequence can then be encoded either as an P (predictive) frame or a B (bi-directional predictive-coded) frame which includes only the difference or motion vector data resulting from the frame comparisons. P or B frames can continue to be used for encoding the succeeding frames in the sequence until a substantial change, such as a scene change, occurs, thus necessitating formation of another I frame. In practice, however, the encoder is programmed to encode I frames at a constant rate, such as for every other N frames. The MPEG encoding procedure thus compresses images by suppressing statistical and subjective redundancy inter and intra frames. An MPEG decoder is capable of decompressing the coded image close to its original format so that the decompressed image may be displayed on a display device, such as a television or computer monitor.

In the Internet Web page display application, only P frames are usually employed for inter frame compression because B frame coding requires comparison with post (later in time) frames which are not available immediately. However, a B frame can be encoded by forward comparison only between the current frame and the prior frame as a special case, and in this instance, can also be employed for Web page inter frame compression.

In the application of MPEG encoding to the previously described CATV system, each user's set top box includes an MPEG decoder for decoding the digital video bit stream received on the downstream channels. This requires that any Internet Web page image data to be transmitted to the set top boxes also be MPEG encoded. An MPEG encoder is thus incorporated in the cable headend to encode the browser generated Web page image data, which usually is a bit map, before it is transmitted on one of the downstream channels to a user's set top box.

In general, however, MPEG encoding of Web page image data is needlessly intensive from a computation standpoint since Web pages do not usually incorporate full motion video, and often appear to be nothing more than a still image. Strictly speaking, though, the Web page is not a still image. Due to the limited viewing size of a display device, the Web page is usually larger than the display device's viewing area. A user may therefore scroll a Web page to move the page horizontally or vertically to view the whole page. Depending on the speed at which the page is scrolling, the images on the display device may thus be considered to be a series of video frames displayed at a variable frame rate. Other Web pages may contain a small animation window in which several localized pictures are alternatively displayed at a certain rate. JAVA applets animation and regional character updates which occur as a user types an e-mail message are other examples of this local animation scenario. In both of these cases, MPEG inter frames may be constructed after the generation of a first, intra frame, to reduce the number of bits needed to represent each frame, thus substantially reducing the required bandwidth in the communication link.

As discussed previously, when an inter frame is generated, motion vectors must be found, coded and transmitted so that the MPEG decoder can reform the frame. A motion vector search is one of the most difficult tasks in designing an MPEG encoder. Since the MPEG committee defined only the syntax and semantics of a compressed frame, but did not define how motion vectors searching should be implemented, numerous proprietary motion vector search algorithms were developed by various encoder vendors. For continuous video compression, however, a motion vector search is very complicated and requires a large percentage of the entire encoding computational effort. More particularly, in MPEG encoding, each video frame to be encoded is subdivided into a plurality of multiple 64 (8×8) pixel blocks, and four such blocks covering a 16×16 pixel area are known as a macroblock. During encoding, the MPEG encoder searches for the best match between each macroblock of a present frame to be encoded with the corresponding macroblock in the previous frame. This search for the best match is known as motion estimation.

The existing algorithms for motion estimation fall into two categories: feature/region matching and gradient-based. In the first category, both block matching and hierarchical block catching can be employed for motion estimation. For encoding a continuous video, the encoder has to search the entire screen (exhaustive search) to find the best match because the encoder knows nothing about the motion from frame to frame. In gradient-based motion estimation, the exhaustive search may be avoided at the price of solving linear equations during search.

All of the algorithms require many iterations to complete the motion estimation. After the best match is found, the difference between the matched macroblocks is calculated by comparing the macroblocks. If the difference is small enough, a motion vector is generated which determines the direction and offset of the motion. Both the difference and the motion vector are encoded and transmitted. If the difference is larger than a threshold, the macroblock of the present frame is allowed to be intra compressed as one encoded in an I frame.

In view of the foregoing, any video image encoding technique that eliminates the need for motion vector search algorithms would be desirable in view of the resulting substantial savings in computation time and intensity.

SUMMARY OF THE INVENTION

The present invention provides an encoding technique for encoding low-frame rate video image data, such as Internet Web pages, in which motion vectors are generated without search algorithms by taking advantage of prior knowledge regarding one or more characteristics of the images. In the preferred embodiments of the invention, the image characteristics are provided to an encoder, such as an MPEG encoder, from an image generating application, and relate to movement of or in the images.

More particularly, both embodiments of the invention are designed specifically for use with CATV systems, as discussed previously, which include Internet access capabilities. In these systems, when a user scrolls through a Web page, scrolling input signals are sent by the user's set top box to the browser application in the headend. These signals define the direction of the scrolling and its offset, typically in terms of x and y coordinates. In addition, the Web pages may contain one or more animation windows, the graphical content of which alternates or changes every second or so. The browser application can easily detect whether one or more animation windows is present in the Web page image, and if so, determine the coordinates of the animation window(s). The scrolling coordinate and animation window information can also be employed by the encoder to determine the exact change between a previous image frame and a present image frame that has occurred as a result of the scrolling and/or animation window movement. With this knowledge, a motion vector search is unnecessary, and can be replaced with a set of calculations employing the scrolling coordinates.

In the first preferred embodiment of the present invention, the encoder employs the scrolling coordinates to determine motion estimation for all of the macroblocks in the present frame relative to the previous frame in a single step, and without a multiple iteration search. A comparison between the macroblock of the present frame and the corresponding macroblock of the previous frame determined by the motion estimation, indicates whether the changed macroblock is the same as the corresponding macroblock in the previous frame which has been shifted in the direction and amount specified by the scrolling coordinates. If so, the motion vector for this macroblock of the frame has been located, and the motion vector and the difference between the macroblocks is encoded and transmitted. The process is repeated for each macroblock in the frame to generate the resulting inter frame. The resulting motion vector calculation and algorithm using the scrolling coordinates requires much less computation than a full search algorithm.

In the second preferred embodiment, the encoder receives animation window or other information from the browser application that indicates that certain portions of an image are continuously changing, and thus should be encoded as an intra frame. If the browser application detects that one or more animation windows are present in the Web page image, it determines the coordinates of the animation window(s), and passes the coordinates to the encoder. The encoder knows that only the portions of the Web page enclosed by the animation window will undergo changes from frame to frame, absent any scrolling operations. Thus, if the encoder receives animation window coordinates from the browser application, the encoder knows that it can encode the present frame of the Web page by encoding only those macroblocks that are contained in the one or more animation windows. These are encoded either as intra macroblocks (no need for motion estimation) or as forward predictive coded macroblocks by performing a motion estimation constrained within the animation window. The remaining macroblocks are encoded as zero motion vector blocks, which means that they have not changed from the previous frame.

BRIEF DESCRIPTION OF THE DRAWINGS

The features and advantages of the present invention will become apparent from the following detailed consideration of a number of preferred embodiments thereof, taken in conjunction with the accompanying drawings, in which.

DETAILED DESCRIPTION OF THE PREFERRED EMBODIMENTS

Figure 1:
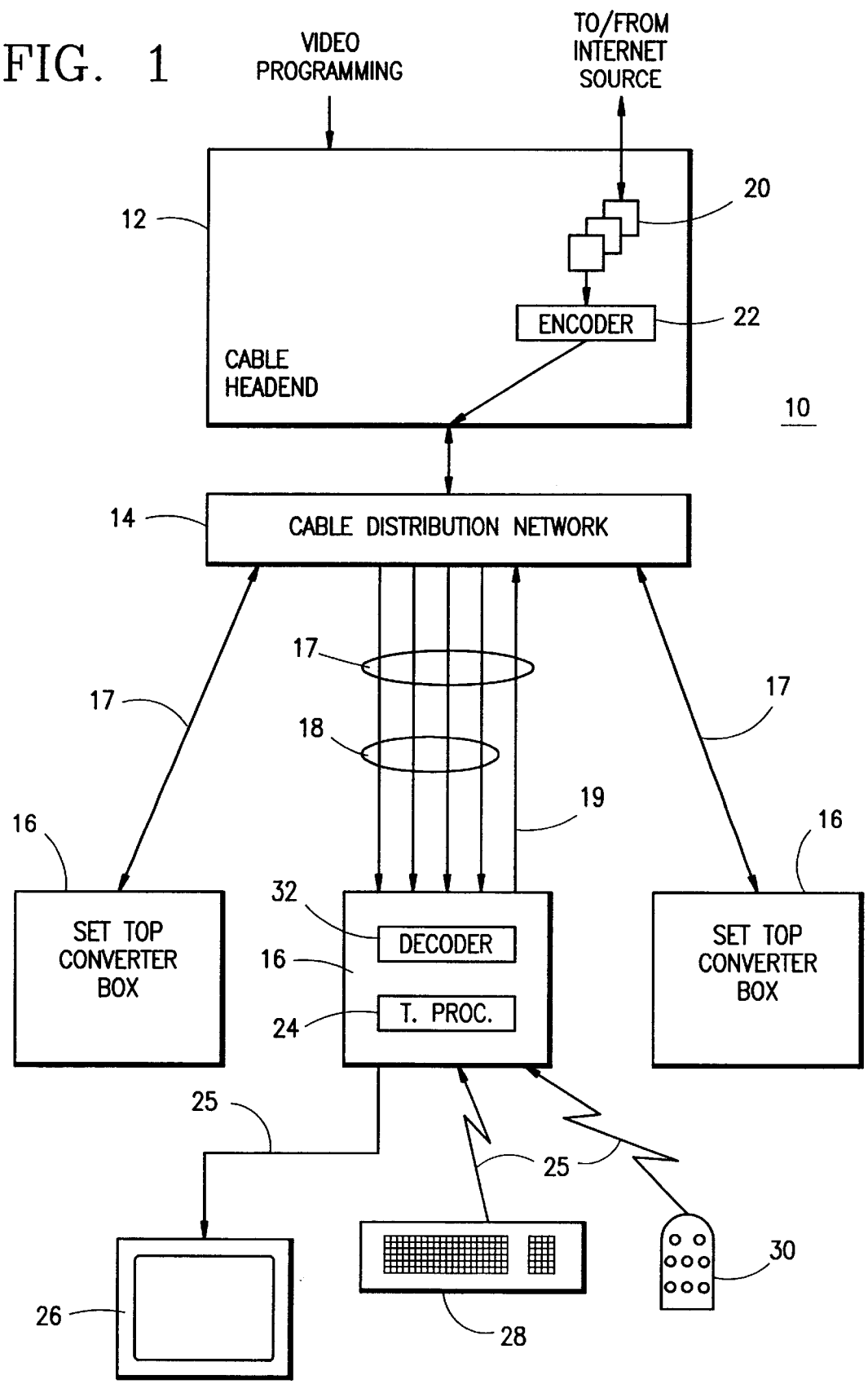
FIG. 1 is a block diagram of a CATV system which incorporates Internet access capabilities, and can employ a digital encoding or compression algorithm based on the principles of the present invention.

FIG. 1 is a general block diagram of a CATV system 10 which incorporates elements for facilitating access to the Internet by a plurality of system users, and is illustrative of one type of system with which the concepts of the present invention may be employed. It should be noted that the CATV system 10 is illustrated in general form since many of its detailed elements are not necessary for an understanding of the present invention.

The CATV system 10 includes a cable headend 12 and a cable television distribution network 14 for interfacing the headend 12 to a plurality of set top converter boxes 16. A plurality of bi-directional transmission links 17 interconnects the set top converter boxes 16 with the distribution network 14, each of which includes a plurality of downstream channels 18 and one or more upstream channels 19. For clarity, the details of only one of the set top boxes 16 and associated elements are illustrated in FIG. 1.

The cable headend 12 receives video programming and Internet-based information from remote sources (not shown), and transmits the video programming and other information through the distribution network 14 to the set top boxes 16. Typically, the video programming is received from the remote source in either an analog format, or a digitally compressed or encoded format, such as MPEG 1 or MPEG 2. The Internet-based information, on the other hand, is typically HTML coded Web pages along with still images coded in JPEG or GIF formats which is employed by one or more browser applications 20 to generate Web page bit map images. A video encoder 22, which may be an MPEG 1 or MPEG 2 encoder, for example, is also provided in the headend 12 for encoding the Web page bit map images before they are transmitted by the distribution network 14 to the set top boxes 16. The encoder 22 is employed to reduce the bandwidth necessary to transmit the data generated by the browser application 20, and to generate an MPEG standard compliant video stream.

Each of the set top boxes 16 is interfaced via a terminal processor 24 and associated communication links 25 (e.g., cables, infrared wireless links, etc.) to a television or monitor 26, and one or more input devices, such as a wireless keyboard 28 and a remote controller 30. As each set top box 16 receives the digitally (e.g., MPEG) encoded or compressed video programming and Internet-based information from the distribution network 14, it is passed through a decoder 32 which restores the video programming signals and Web page image data to their original form for display on the television or monitor 26. The decoder 32 is of the same format as the encoder 22, such as MPEG 1 or MPEG 2, for example.

The CATV system 10 thus allows a system user to conduct an Internet session by sending appropriate commands via the keyboard 28 and/or remote controller 30 to the headend 12. In response, the headend 12 connects the user to one of the browser applications 20, and retrieves the requested Internet information from the remote source. The visual information generated by the browser application 20 is encoded and downloaded to the user's set top box 16 for display on their television or monitor 26.

To encode the Web page image bit map data generated by the browser application 20, the encoder 22 employs any known conventional algorithm for encoding motion picture video frames, such as MPEG 1 or MPEG 2. Motion picture video encoders encode and compress the video data by comparing each successive video frame with a previous frame, and transmitting a predictive-coded or P frame which includes information only about pixels in the video image that have changed from the previous frame. In motion picture video, where each succeeding frame usually differs only slightly from a previous frame, this technique results in a substantial reduction in the amount of data that has to be transmitted with each frame. A P frame primarily consists of motion vectors and prediction errors associated with each macroblock. The motion vector of a macroblock indicates the direction and magnitude of the motion of the macroblock from the previous frame to the present one. All motion vectors are coded using variable length coding (VLC). The prediction errors identify the difference between the macroblock in the previous frame and the predictive one in the present frame shifted by the motion vector. The prediction errors are transformed into frequency domain by using a Discrete Cosine Transform whose coefficients then are coded by VLC. This technique also results in a substantial reduction in the amount of data that needs to be transmitted for each image, especially in situations where large portions of a total image are moving from frame to frame.

Since most existing motion vector search algorithms are very iterative in nature, they are computationally intensive and time consuming to employ. The present invention eliminates the need for employing motion vector search algorithms in specific instances which are particularly applicable to the encoding of the Web page image data where additional information regarding any changes from frame to frame in the image is available for use by the encoder 22. With this additional information, the encoder 22 is able to identify portions of a Web page in a present frame, which have moved or changed from the previous frame, by using a set of calculations instead of a motion vector search algorithm.

Figure 2:
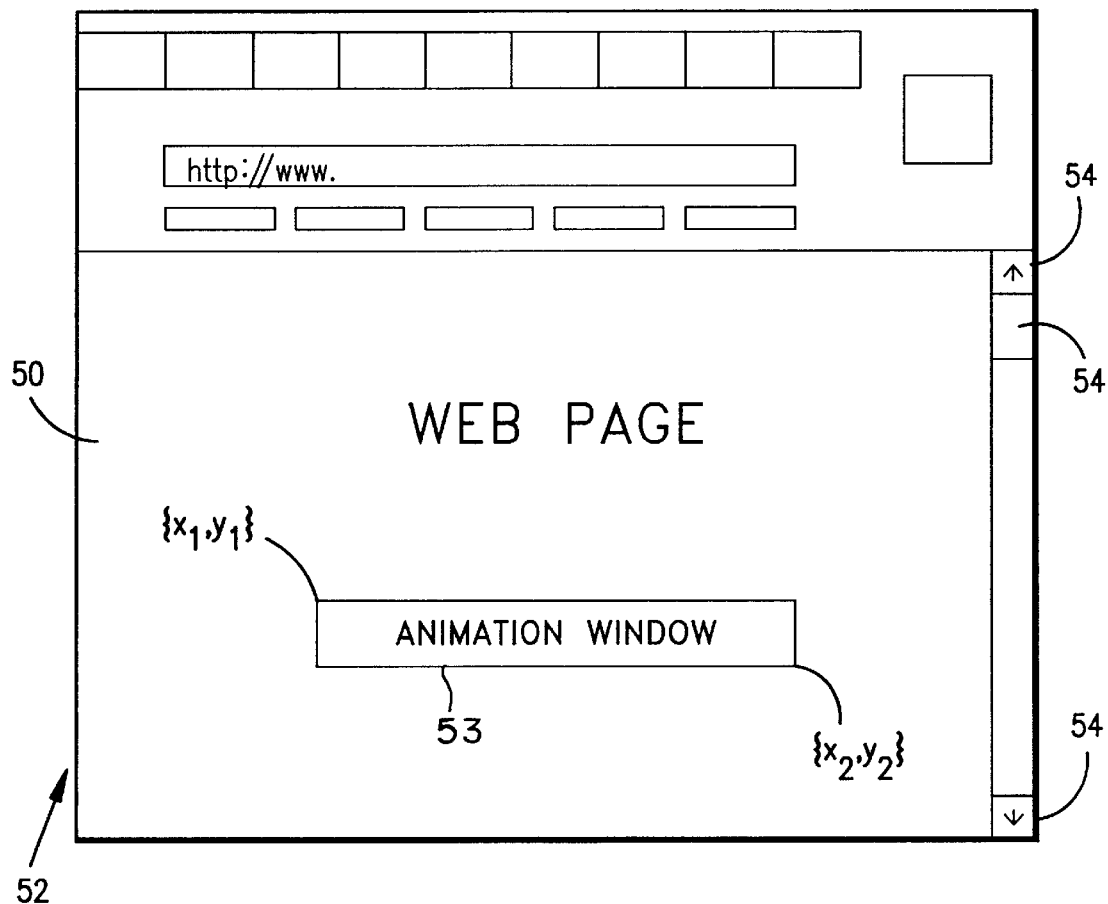
FIG. 2 is an illustration of an Internet Web page having an animation window therein.

In a first preferred embodiment of the invention, a motion vector to be employed in the formation of an MPEG P frame, is generated in which the motion of a Web page or other image is a result of a scrolling operation performed by an end user through use of their keyboard 28 or remote controller 30. FIG. 2 illustrates a Web page 50 as displayed in a browser application display image 52. The Web page 50 includes an animation window 53 that is a rectangular shaped area in which the graphical content changes or alternates periodically, such as once every second. As is conventional, the browser application provides a number of scrolling buttons 54 along the right side of the display image 52 to facilitate scrolling operations using the remote controller 30 as a pointing device. In the example of the system 10 of FIG. 1, when a user scrolls the displayed Web page 50 using either the keyboard 28 or the remote controller 30, the scrolling commands are sent to the browser application 20 which performs the actual scrolling operation. This translates the Web page image, thus necessitating the formation of a number of a P frames by the encoder 22 to transmit the necessary image change information to the user's set top box 16.

Figure 3:
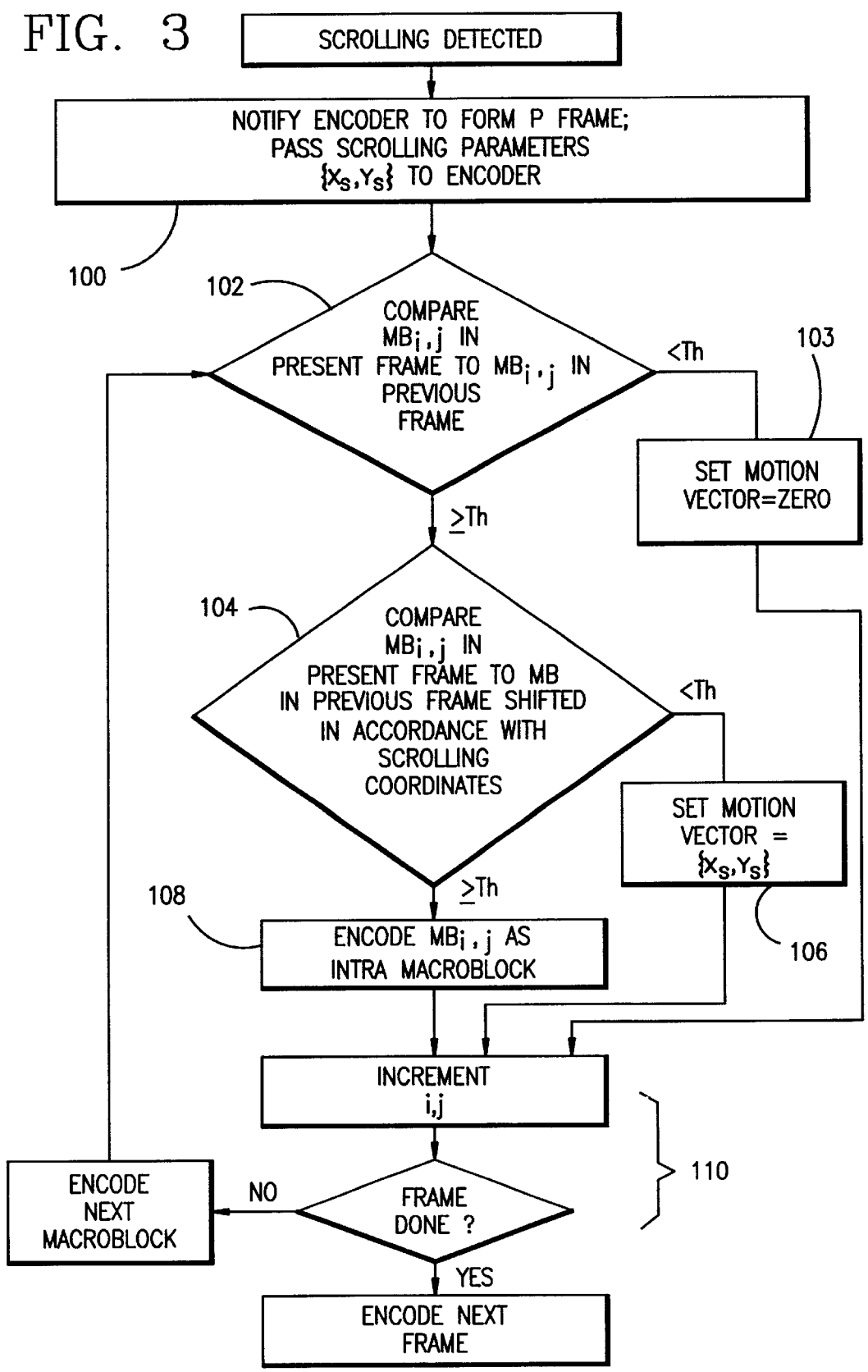
FIG. 3 is a flow chart of an algorithm for locating portions of an image frame which have moved relative to a previous image frame as a result of a scrolling operation, said algorithm comprising a first preferred embodiment of the present invention.

FIG. 3 is a flow chart of the steps employed in the first embodiment of the present invention to encode the Web page images when a scrolling operation occurs. First, at step 100, when the browser application 20 detects a scrolling operation, it will notify the encoder 22 to form a P frame for the operation. In addition to the operation type, the browser application 20 will pass two scrolling parameters to the encoder 22, these being the scrolling direction and offset or distance. The direction of the scrolling is defined as follows:

(1) Horizontally scrolling left: the content in a window contained in the Web page image moves right;
(2) Horizontally scrolling right: the content in a window contained in the Web page image moves left;
(3) Vertically scrolling up: the content in a window contained in the Web page image moves downward;
(4) Vertically scrolling down: the content in a window contained in the Web page image moves upward; and
(5) Horizontally and vertically scrolling simultaneously: the content in a window contained in the Web page image moves diagonally.

As discussed previously, in an MPEG encoder, for example, two consecutive frames of a video image, F(n−1) and F(n), are employed for motion vector calculation. Suppose frame F(n) is a result of scrolling from frame F(n−1). In this case, the scrolling direction and scrolling offset or distance are determined by a pair of scrolling parameters, Xs and Ys, which are illustrated in Table 1:

$$F(n)=\{MB_{i,j}(n)|i=0,1,\ldots,N-1;j=0,1,\ldots,M-1\}$$

and $$MB_{i,j}=\{p_{16i+u,16j+v}|u,v=0,1,\ldots,15\} \quad (1)$$

where $p_{u,v}(n)$ is a pixel at coordinate (u, v) in the nth frame.

The motion vectors are calculated in the following manner. Each macroblock in the present frame is examined one at a time. For example, the process is started with the macroblock on the left top corner of the frame, i.e., i=0 and j=0.

First, at step 102, the macroblock in the present (nth) frame is compared with the macroblock in the same location in the previous or (n−1)th frame to determine if the difference in pixel intensities between the two macroblocks is smaller than a predetermined threshold Th as determined by equation 2:

$$\|MB_{i,j}(n) - MB_{i,j}(n-1)\| = \sum_{u,v=0}^{15} [p_{16i+u,16j+v}(n) - p_{16i+u,16j+v}(n-1)]^2 < Th. \quad (2)$$

If the inequality in equation 2 is satisfied, the macroblock $MB_{i,j}$ is considered to be in the non-scrolling area of the image. In other words, the macroblock has not changed from the (n−1)th frame to the nth frame. Thus, the motion vector associated with this macroblock is set to zero at step 103. That is, $$MV_{i,j}(n)=(0,0) \quad (3)$$

If, on the other hand, the inequality in equation 2 is not satisfied, then the algorithm proceeds to step 104 in which

TABLE 1

|  | Xs < 0 | Xs = 0 | Xs > 0 |
| --- | --- | --- | --- |
| Ys < 0 | Scrolling diagonally; upward vertically by •Ys• pixels and left horizontally by •Xs• pixels | No horizontal scrolling; scrolling upward vertically by •Ys• pixels | Scrolling diagonally; upward vertically by •Ys• pixels and right horizontally by Xs pixels |
| Ys = 0 | Scrolling left horizontally by •Xs• pixels, no vertical scrolling | No horizontal scrolling; no vertical scrolling | Scrolling right horizontally by Xs pixels, no vertical scrolling |
| Ys > 0 | Scrolling diagonally; downward vertically by Ys pixels and left horizontally by •Xs• pixels | No horizontal scrolling; scrolling downward vertically by Ys pixels | Scrolling diagonally; downward vertically by Ys pixels and right horizontally by Xs pixels |

Usually, a Web page scrolling does not require full screen scrolling because, (1) an overall fixed window frame exists all of the time which does not scroll at all; and (2) there are some Web pages containing multiple sub-windows. The contents in the sub-windows may be scrolled separately and independently. It is assumed that scrolling may move the contents only in one of the sub-windows. The display screen, therefore, is divided into a scrolling area and a non-scrolling area.

With reference again to the flow chart of FIG. 3, the next steps are employed to identify scrolling and non-scrolling areas of a Web page or other image by dividing an image frame into a plurality of multiple pixel macroblocks (MB). For example, each macroblock can be a square 16×16 pixels in size. Suppose that a frame, F(n), consists of M rows and N columns of macroblocks:

the macroblock in the nth frame is compared with the same macroblock shifted by either Xs or Ys in the (n−1)th frame by using the following equation:

$$\|MB_{i,j}(n) - MB_{i+X_s/16,j+Y_s/16}(n-1)\| = \sum_{u,v=0}^{15} [p_{16i+u,16j+v}(n) - p_{16i+X_s+u,16j+Y_s+v}(n-1)]^2 < Th \quad (4)$$

If the inequality in equation 4 is satisfied, the macroblock $MB_{i,j}(n)$ is said to be in the scrolling area, and can be reconstructed at step 106 by shifting macroblock $MB_{i+X_s/16, j+Y_s/16}(n-1)$ by −Xs and −Ys pixels. Notice that the shifting offsets, $X_s$ and $Y_s$, may not necessarily be multiple of integer 16, therefore, the macroblock may not align with macroblock boundary. It follows from the definition of a motion vector that the compensation motion vector for this macroblock $MB_{i,j}$ (n) is:

$$MV_{i,j}(n)=(X_s,Y_s) \qquad (5)$$

If both of the inequalities in equations 2 and 4 are not satisfied, the macroblock $MB_{i,j}$ (n) cannot be identified using a motion vector, and must be encoded at step 108 as an intra-macroblock.

Once either a motion vector is generated for the macroblock using equations 3 or 5, or the macroblock is encoded as an intra-macroblock, the algorithm proceeds to step 110 in which the indices, i and j, are incremented, and are checked to see whether the last macroblock in the frame has been encoded. If not, the program returns to step 102 to encode the next macroblock in the frame. If the last macroblock has already been encoded, the encoding of the P frame is complete, and the procedure is repeated for the next frame.

The foregoing motion vector calculation algorithm requires much less computation than a full screen search algorithm. Furthermore, the best case will be a found match between two macroblocks in the first step 102 of the procedure. In this case, the search for the motion vector is done in one step for the macroblock. It is assumed that the neighboring macroblocks will fall in the same kind of area (scrolling or non-scrolling). If a macroblock is found in a scrolling area, then for the next macroblock on the same slice, step 102 may be switched with step 104 in the process to check whether the macroblock is in the scrolling area first, since it is likely that this is the case. In other words, the conditional probability that a macroblock $MB_{i+1,j}$ (n) will fall in a scrolling area, given that the adjacent macroblock, $MB_{i,j}$ (n) is in the scrolling area, is much higher than the likelihood that the macroblock $MB_{i+1,j}$ (n) is in a non-scrolling area as defined by the following equation:

$$P\{MB_{i+1,j}(n)\in S|MB_{i,j}(n)\in S\}>>P\{MB_{i+1,j}(n)\notin S|MB_{i,j}(n)\in S\} \qquad (6)$$

where S is a scrolling area. Similarly, if a macroblock is found in a non-scrolling area, no switch between step 102 and step 104a is necessary for checking the next macroblock for the same reason. Therefore, most of the macroblocks need only one step to find their motion vectors. Of course, the worst case scenario will be when no matches are found in either step 102 or step 104. However, this should rarely happen in a normal scrolling operation, with the exception of the case where both scrolling and animation occur simultaneously.

Figure 4:
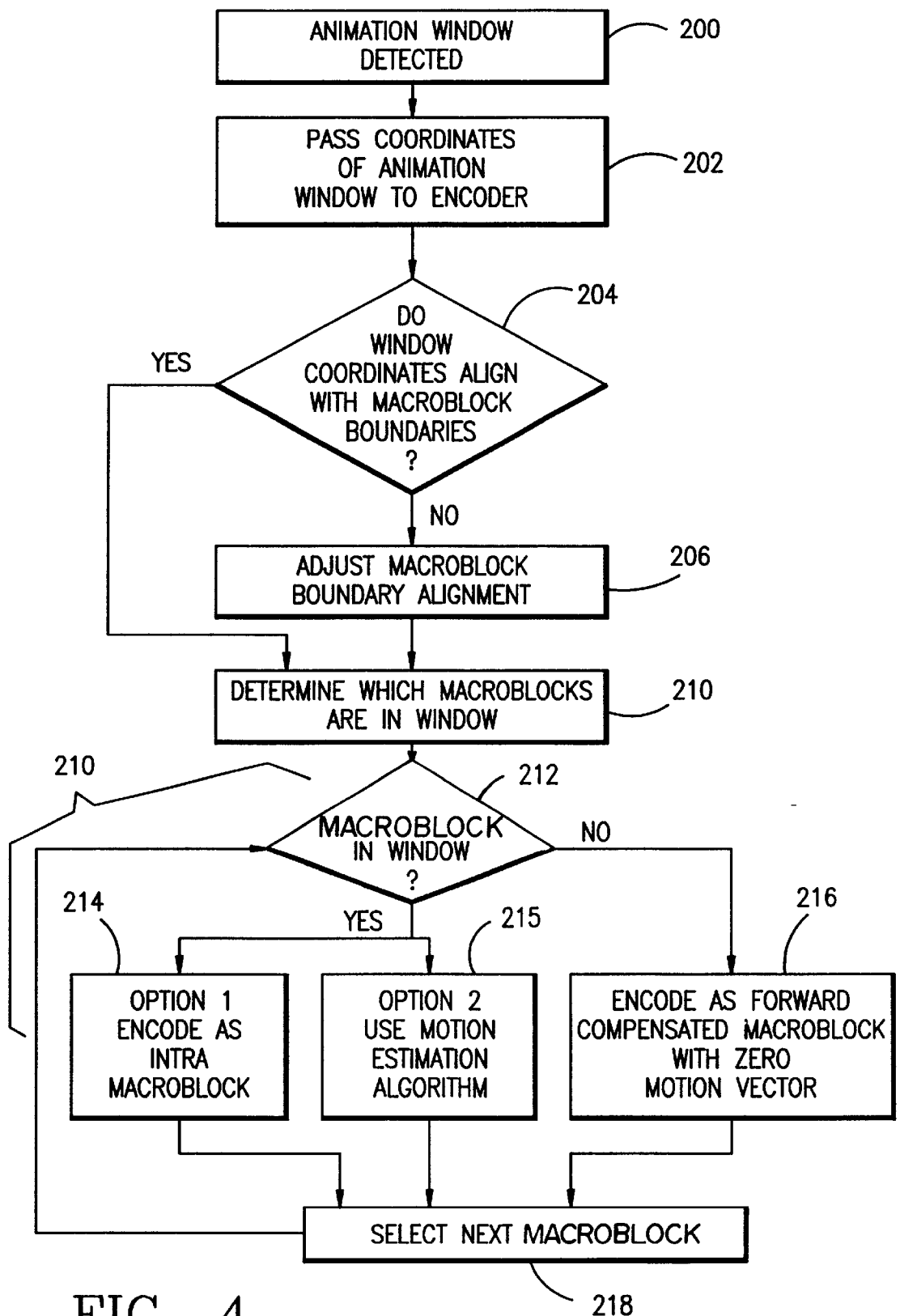
FIG. 4 is a flow chart of an algorithm comprising a second preferred embodiment of the present invention for encoding video images having animation windows therein.

Turning now to a second preferred embodiment of the invention, FIG. 4 is a flow chart illustrating the steps carried out by an algorithm which detects an animation window in a Web page, and encodes the Web page image data in accordance with the animation window coordinates. Returning briefly to FIG. 2, the animation window 53 can be defined by x and y coordinates. Let Sx and Sy be the total number of pixels in the x and y directions, respectively, of the entire browser application display image 52. The animation window 53 can then be defined as:

$$W_\alpha=\{(x_1,y_1) \text{ and } (x_2,y_2)|0\leq x_1<x_2<S_X, 0\leq y_1<y_2<S_Y\} \qquad (7)$$

With reference to FIG. 4, a first step 200 in this embodiment of the invention is for the browser application 20 to detect whether one or more animation windows is/are present in the currently displayed Web page. If so, the browser application 20 passes, at step 202, the x,y coordinates of the one or more animation windows to the encoder 22.

Next, at step 204, the encoder 22 determines whether the animation window coordinates align with the macroblock boundaries employed by the encoder 22. In the vast majority of cases, the animation window(s) will not line up with the macroblock boundaries. In this case, the encoder 22 proceeds to step 206 to adjust the macroblock boundary alignment so that each animation window is expanded to its nearest macroblock boundaries. The following equations are used for the macroblock boundary alignment adjustment:

$$x'_1 = \frac{x_1}{16}*16 \qquad (8)$$

$$y'_1 = \frac{y_1}{16}*16$$

$$x'_2 = \frac{x_2}{16}*16+15$$

and $$y'_2 = \frac{y_2}{16}*16+15$$

The four equalities of equation 8 are integer operations which generate a new set of coordinates that define a new animation window whose frame boundary aligns with the macroblock boundaries, and is defined as:

$$W'_\alpha=\{(x'_1,y'_1) \text{ and } (x'_2,y'_2)|0\leq x'_1<x'_2<S_X, 0\leq y'_1<y'_2<S_Y\} \qquad (9)$$

Since all of the macroblocks in an image frame are mutually exclusive (no overlapping), the animation window in equation (9) can be redefined as:

$$W'_\alpha=\{MB_{i,j}(n)|x'_1\leq 16i<x'_2, y'_1\leq 16j<y'_2)\} \qquad (10)$$

Equation 10 defines a window that consists of all of the macroblocks enclosed by the window. This equation is therefore used at step 208 to verify whether a particular macroblock belongs to the animation window or not.

Once the macroblocks defining the one or more animation windows have been determined at step 208 using the foregoing equations, the next step 210 is to encode the Web page image data as a P frame. For a given animation window of a Web page, the following substeps of step 210 are employed to encode the P frame. At step 212, the algorithm starts with the top left macroblock in a frame (i=0 and j=0) and continues the following algorithm for all of the macroblocks in the frame. If a macroblock $MB_{i,j}$ (n) is found by equation 10 to be an element in an animation window, then two options are available to encode the macroblock. If encoding time is a major consideration, it will be simply encoded at step 214 as an intra macroblock at the price of more bits generated. If higher compression ratio is more preferable due to communication bandwidth limitation, any motion estimation algorithm may be employed at step 215 to search for motion vectors within the animation window. This process is not nearly as intensive as performing a motion vector search of the full screen image since the animation window is much smaller than a full screen. If a macroblock $MB_{i,j}$ (n) is not located within the animation window, it is encoded at step 216 as a forward compensated macroblock, with a zero motion vector. Basically, this macroblock can be skipped if it is not at the very beginning or the end of a slice. In other words, this macroblock will not have changed from the previously encoded frame, and thus no new information need be encoded for this macroblock. Thus, only those macroblocks which are included in any detected animation windows that are present in the Web page will need to be encoded by the encoder 22, and transmitted to the set top converter box's decoder 32. Finally, at step 218, the next macroblock, if any, in the frame is selected, and encoded by returning to step 212.

In a case where both scrolling and animation occur simultaneously when a user scrolls a Web page with animation window(s), the browser application must pass a scrolling operation type to the encoder. The inequalities of both equations (2) and (4) in the first preferred embodiment of the invention will not be satisfied for the macroblocks in an animation window during scrolling. Those macroblocks will be automatically encoded as intra macroblocks.

In conclusion, both embodiments of the present invention provide simplified video encoding or compression for encoding image data, particularly Web page images. In both embodiments of the present invention, knowledge of prior operation conditions completely eliminates the need to perform motion vector searches during encoding of a P frame. Instead, the prior knowledge enables the motion vectors to either be calculated by given equations, or set to zeros. This efficient technique makes it feasible to create an MPEG encoder, for example, in a real time software program.

Although the invention has been disclosed in terms of a number of preferred embodiments, it will be understood that numerous variations and modifications could be made thereto without departing from the scope of the invention as defined in the following claims. For example, although the preferred embodiments are directed specifically to encoding of Internet Web pages, the invention can obviously be applied to any video or image encoding application where prior knowledge of the changes or movement in the video or images is available so that motion vector searches need not be utilized to generate P and B frames. In addition, the invention is not limited to use with MPEG encoders for generating P frames, and can be employed with other video encoding schemes and/or encoded frame types.

What is claimed is:

1. A method for encoding multiple frame image data comprising:
   a) generating a sequence of image frames;
   b) supplying said sequence of image frames to an encoder;
   c) providing information to said encoder identifying a characteristic of said sequence of image frames; and
   d) encoding at least a portion of said at least one frame in said sequence without employing a motion vector search al origin by employing said characteristic identifying information and image information relating to at least one previous image frame in said sequence.

2. The method of claim 1, wherein said sequence of image frames is generated by an Internet browser application, and comprises sequential images of one or more Internet Web pages.

3. The method of claim 1, wherein said characteristic identifying information comprises scrolling coordinate information.

4. The method of claim 3, wherein said step of encoding further comprises:
   1) calculating at least one motion vector for a frame to be encoded using said scrolling coordinate information; and
   2) encoding said frame to be encoded as an inter frame using said at least one motion vector and said image information for a previous frame.

5. The method of claim 4, wherein said characteristic information further includes location information identifying the location of at least one animation window in an image, and said step of encoding further comprises encoding a portion of said frame containing said animation window as an intra frame.

6. The method of claim 3, wherein each of said frames in said sequence is comprised of a plurality of multiple pixel macroblocks, and said step of encoding further comprises:
   1) comparing pixel intensities in a first macroblock of a frame to be encoded with pixel intensities of a corresponding macroblock at a same location in a previous frame;
   2) if the difference in pixel intensities between said macroblock to be encoded and said corresponding macroblock is below a predetermined threshold, then setting a motion vector to zero for said macroblock to be encoded, and, if any uncoded macroblocks remain in said frame to be encoded, returning to step 1 for a next macroblock in said frame;
   3) if the difference in pixel intensities between said macroblock to be encoded and said corresponding macroblock is above a predetermined threshold, then comparing said macroblock to be encoded with a corresponding shifted macroblock in a previous frame that is shifted in direction and offset in accordance with said scrolling coordinate information;
   4) if the difference in pixel intensities between said macroblock to be encoded and said corresponding shifted macroblock is below a predetermined threshold, then employing said scrolling coordinate information to calculate a motion vector for said macroblock to be encoded, and, if any uncoded macroblocks remain in said frame to be encoded, returning to step 1 for a next macroblock in said frame; and
   5) if the difference in pixel intensities between said macroblock to be encoded and said corresponding shifted macroblock is above a predetermined threshold, then encoding said macroblock to be encoded as an intra-macroblock, and, if any uncoded macroblocks remain in said frame to be encoded, returning to step 1 for a next macroblock in said frame.

7. The method of claim 6, wherein steps 3 and 4 are performed before steps 1 and 2 for a next macroblock to be encoded if the difference in pixel intensities between a present macroblock to be encoded and said corresponding shifted macroblock is below a predetermined threshold, and the next macroblock to be encoded is adjacent said present macroblock to be encoded.

8. The method of claim 1, wherein said characteristic identifying information comprises location information identifying the location of at least one animation window in an image, and said step of encoding further comprises encoding said frame to be encoded using said location information.

9. The method of claim 8, wherein each of said frames in said sequence is comprised of a plurality of multiple pixel macroblocks, and said step of encoding further comprises:
   1) employing said location information to identify one or more macroblocks in a frame to be encoded which include at least a portion that forms part of said at least one animation window;
   2) encoding said one or more macroblocks as intra-macroblocks; and
   3) encoding any remaining macroblocks in said frame to be encoded as forward predictive coded macroblocks, with a zero motion vector.

10. The method of claim 8, wherein each of said frames in said sequence is comprised of a plurality of multiple pixel macroblocks, and said step of encoding further comprises:

1) employing said location information to identify one or more macroblocks in a frame to be encoded which include at least a portion that forms part of said at least one animation window;

2) encoding said one or more macroblocks by employing a motion vector search algorithm; and 3) encoding any remaining macroblocks in said frame to be encoded as forward predictive coded macroblocks, with a zero motion vector.

11. The method of claim 1, wherein said encoding is performed using a digital video encoding format.

12. A system for encoding multiple frame image data comprising:

a) an image generating application for generating a sequence of image frames to be encoded, said application including information identifying a characteristic of said sequence of image frames; and b) an encoder for receiving said sequence of image frames from said application and encoding said frames, said encoder including means for obtaining said information from said application identifying a characteristic of said sequence of image frames, and encoding at least a portion of at least one frame in said sequence without employing a motion vector search algorithm by employing said characteristic identifying information and image information relating to at least one previous image frame in said sequence.

13. The system of claim 12, wherein said image generating application comprises an Internet browser application, and said sequence of image frames comprise sequential images of one or more Internet Web pages.

14. The system of claim 13, wherein said encoder is a digital video encoder.

15. The system of claim 13, wherein said browser application and said encoder are disposed in a cable television system headend, and a plurality of downstream communication channels is provided for transmitting encoded Internet Web page data from said encoder to one or more remotely located set top converter boxes.

16. The system of claim 12, wherein said characteristic identifying information comprises scrolling coordinate information which is generated by said image generating application, and said encoder includes means for generating motion vectors using said scrolling coordinate information.

17. The system of claim 16, wherein said characteristic identifying information further comprises location information identifying the location of one or more animation windows in an image frame.

18. The system of claim 16, wherein each of said frames in said sequence is comprised of a plurality of multiple pixel macroblocks, and said encoder further includes means for carrying out the following steps:

1) comparing pixel intensities in a first macroblock of a frame to be encoded with pixel intensities of a corresponding macroblock at a same location in a previous frame;

2) if the difference in pixel intensities between said macroblock to be encoded and said corresponding macroblock is below a predetermined threshold, then setting a motion vector to zero for said macroblock to be encoded, and, if any uncoded macroblocks remain in said frame to be encoded, returning to step 1 for a next macroblock in said frame;

3) if the difference in pixel intensities between said macroblock to be encoded and said corresponding macroblock is above a predetermined threshold, then comparing said macroblock to be encoded with a corresponding shifted macroblock in a previous frame that is shifted in direction and offset in accordance with said scrolling coordinate information;

4) if the difference in pixel intensities between said macroblock to be encoded and said corresponding shifted macroblock is below a predetermined threshold, then employing said scrolling coordinate information to calculate a motion vector for said macroblock to be encoded, and, if any uncoded macroblocks remain in said frame to be encoded, returning to step 1 for a next macroblock in said frame; and 5) if the difference in pixel intensities between said macroblock to be encoded and said corresponding shifted macroblock is above a predetermined threshold, then encoding said macroblock to be encoded as an intra-macroblock, and, if any uncoded macroblocks remain in said frame to be encoded, returning to step 1 for a next macroblock in said frame.

19. The system of claim 18, wherein said encoder further includes means for performing steps 3 and 4 before steps 1 and 2 for a next macroblock to be encoded if the difference in pixel intensities between a present macroblock to be encoded and said corresponding shifted macroblock is below a predetermined threshold, and the next macroblock to be encoded is adjacent said present macroblock to be encoded.

20. The system of claim 12, wherein said characteristic identifying information comprises location information identifying the location of at least one animation window in an image, wherein each of said frames in said sequence is comprised of a plurality of multiple pixel macroblocks, and wherein said encoder further includes means for:

1) employing said location information to identify one or more macroblocks in a frame to be encoded which include at least a portion that forms part of said at least one animation window;

2) encoding said one or more macroblocks as intra-macroblocks; and 3) encoding any remaining macroblocks in said frame to be encoded as forward predictive coded macroblocks, with a zero motion vector.

21. The system of claim 12, wherein said characteristic identifying information comprises location information identifying the location of at least one animation window in an image, wherein each of said frames in said sequence is comprised of a plurality of multiple pixel macroblocks, and wherein said encoder further includes means for:

1) employing said location information to identify one or more macroblocks in a frame to be encoded which include at least a portion that forms part of said at least one animation window;

2) encoding said one or more macroblocks by employing a motion vector search algorithm; and 3) encoding any remaining macroblocks in said frame to be encoded as forward predictive coded macroblocks, with a zero motion vector.

22. A method for encoding Internet Web page images using a video encoding format, said method comprising the steps of:

a) providing an Internet browser application;

b) generating a sequence of Web page image frames with said browser application;

c) providing said sequence of frames to a video image encoder;

d) providing additional information from said browser application to said video image encoder, said information selected from the group comprising scrolling coordinate information and animation window location information; and e) encoding at least one of said frames with said encoder by employing said scrolling coordinate and/or animation window location information, and information relating to a previous frame in said sequence.

23. The method of claim 22, wherein said encoding is performed using a digital video encoding format.

24. The method of claim 22, wherein said step of encoding further comprises:

1) calculating at least one motion vector for a frame to be encoded using said scrolling coordinate information; and 2) encoding said frame to be encoded as an inter frame using said at least one motion vector and said image information for a previous frame.

25. The method of claim 22, wherein said step of encoding further comprises encoding a portion of said frame containing an animation window as an intra frame.

26. A system for encoding Internet Web pages using a video encoding format, said system comprising:

a) an Internet browser application for generating a sequence of Web page image frames to be encoded, said browser application also generating scrolling coordinate and/or animation window location information relating to said sequence; and b) an encoder for receiving said sequence of image frames from said browser application and encoding said frames, said encoder including means for obtaining said scrolling coordinate and/or animation window information from said browser application, and encoding at least one frame in said sequence by employing said scrolling coordinate and/or animation window information and image information relating to at least one previous image frame in said sequence.

27. The system of claim 26, wherein said encoder is a digital video encoder.

28. The system of claim 26, wherein said browser application and said encoder are disposed in a cable television system headend, and a plurality of downstream communication channels is provided for transmitting encoded Internet Web page data from said encoder to one or more remotely located set top converter boxes.

* * * * *

UNITED STATES PATENT AND TRADEMARK OFFICE
CERTIFICATE OF CORRECTION

PATENT NO. : 6,266,369 B1  
DATED : July 24, 2001  
INVENTOR(S) : Chuanming Wang et al.

It is certified that error appears in the above-identified patent and that said Letters Patent is hereby corrected as shown below:

<u>Column 11,</u>  
Line 45, replace "al origin" with -- algorithm --.

Signed and Sealed this

Thirtieth Day of April, 2002

*Attest:*

*Attesting Officer*

JAMES E. ROGAN  
*Director of the United States Patent and Trademark Office*